United States Patent
Franklin et al.

(10) Patent No.: US 10,747,021 B2
(45) Date of Patent: Aug. 18, 2020

(54) FRICTION STABILIZED CONTACT LENSES

(71) Applicant: Johnson & Johnson Vision Care, Inc., Jacksonville, FL (US)

(72) Inventors: Steven Franklin, Eindhoven (NL); Cornelis Petrus Hendriks, Eindhoven (NL); Gregory Hofmann, Jacksonville Beach, FL (US); Jason Tokarski, Jacksonville, FL (US); Thom Warmerdam, Eindoven (NL)

(73) Assignee: Johnson & Johnson Vision Care, Inc, Jacksonville, FL (US)

( * ) Notice: Subject to any disclaimer, the term of this patent is extended or adjusted under 35 U.S.C. 154(b) by 0 days.

(21) Appl. No.: 15/897,308

(22) Filed: Feb. 15, 2018

(65) Prior Publication Data

US 2018/0180902 A1     Jun. 28, 2018

Related U.S. Application Data

(62) Division of application No. 14/925,594, filed on Oct. 28, 2015, now Pat. No. 9,927,633.

(51) Int. Cl.
| | |
|---|---|
| G02C 7/00 | (2006.01) |
| G02C 7/02 | (2006.01) |
| G02C 7/04 | (2006.01) |
| G02C 7/06 | (2006.01) |
| B29D 11/00 | (2006.01) |

(52) U.S. Cl.
CPC .............. *G02C 7/048* (2013.01); *G02C 7/043* (2013.01); *G02C 7/049* (2013.01); *G02C 7/06* (2013.01);
(Continued)

(58) Field of Classification Search
CPC .......... G02C 7/04; G02C 7/028; G02C 7/041; G02C 7/043; G02C 7/048; G02C 7/049;
(Continued)

(56) References Cited

U.S. PATENT DOCUMENTS

| 4,549,794 A | 10/1985 | Loshaek et al. |
| 6,626,534 B1 | 9/2003 | Dimartino |

(Continued)

FOREIGN PATENT DOCUMENTS

| EP | 2626735 A1 | 8/2013 |
| WO | WO1992022845 A1 | 12/1992 |
| WO | WO2008007995 A1 | 1/2008 |

OTHER PUBLICATIONS

Roba, M. et al., "Friction Measurements on Contact Lenses in Their Operating Environment", Tribology Letters, Kluwer Academic Publishers—Plenum Publishers, NE, vol. 44, No. 3, Sep. 17, 2011, pp. 387-397.

(Continued)

*Primary Examiner* — Mustak Choudhury (57) ABSTRACT

A contact lens incorporating one or more surface modified zones on the anterior surface of the lens may be utilized to generate a friction driven rotational force when the upper and/or lower eyelids pass over the one or more regions during blinking. A small difference in the coefficient of friction between the modified and unmodified regions of the lens may result in an equivalent rotational force to that of a thickness gradient lens. This small difference in the coefficient of friction produces a means to orient and stabilize the contact lens on eye.

6 Claims, 3 Drawing Sheets

(52) U.S. Cl.
CPC .. *B29D 11/00038* (2013.01); *B29D 11/00048* (2013.01); *B29D 11/00326* (2013.01)

(58) Field of Classification Search
CPC .... C09D 5/008; C09D 5/1625; C09D 5/1668; C09D 7/1291; A61F 2/14; A61F 2/142; A61K 8/20; G02B 1/043; C08L 83/04
USPC ............ 351/159.08, 159.09, 159.33, 159.36, 351/159.41; 703/2, 11; 427/164
See application file for complete search history.

(56) References Cited

U.S. PATENT DOCUMENTS

| | | | |
|---|---|---|---|
| 7,040,757 B2 | 5/2006 | Hall et al. | |
| 7,052,132 B2 | 5/2006 | Ezekial | |
| 7,543,935 B2 | 6/2009 | Ezekial | |
| 2005/0099595 A1* | 5/2005 | Lindacher | C07K 1/22 351/159.09 |
| 2008/0013044 A1* | 1/2008 | Wanders | G02C 7/041 351/159.08 |
| 2010/0171924 A1 | 7/2010 | Perrin | |
| 2013/0176529 A1* | 7/2013 | Li | G02B 1/043 351/159.33 |
| 2015/0160476 A1* | 6/2015 | Blum | G02C 7/049 351/247 |

OTHER PUBLICATIONS

European Search Report for corresponding EPA No. 16196048.9 dated Jul. 27, 2018.

* cited by examiner

FRICTION STABILIZED CONTACT LENSES

CROSS REFERENCE TO RELATED APPLICATION

The present application is a divisional application of U.S. patent application Ser. No. 14/925,594 filed on Oct. 28, 2015.

BACKGROUND OF THE INVENTION

1. Field of the Invention

The present invention relates to stabilization zones for contact lenses requiring rotational stability, such as toric contact lenses, and more particularly to contact lenses requiring rotational stability and incorporating one or more surface modified zones in specific regions to generate a friction driven rotational force during blinking.

2. Discussion of the Related Art

Myopia or nearsightedness is an optical or refractive defect of the eye wherein rays of light from an image converge to a common focal point that is in front of the retina. Myopia generally occurs because the eyeball or globe is too long or the cornea is too steep. A minus powered spherical optic may be utilized to correct myopia. Hyperopia or farsightedness is an optical or refractive defect of the eye wherein rays of light from an image converge to a common focal point that is behind the retina. Hyperopia generally occurs because the eyeball or globe is too short or the cornea is too flat. A plus powered spherical optic may be utilized to correct hyperopia. In both myopia and hyperopia, the eye (cornea) is substantially spherical in shape, but the curvature is either too steep or too flat, thus causing the light rays of the image to converge in front of or behind the retina.

Astigmatism is a defect in the eye (corneal or lenticular) caused by a deviation from spherical curvature, which results in distorted images as the light rays from the image do not converge to a common focal point, but rather to a line of focus. Astigmatism can occur in combination with myopia or hyperopia and affects a large percentage of the population to some degree. A cylindrical optic, also known as a toric optic, rather than a spherical optic may be utilized to correct astigmatism. Accordingly, an individual with myopia or hyperopia as well as astigmatism would have a single optic with both spherical and cylindrical components.

A toric optic is an optical element having two different target powers in two orientations that are perpendicular to one another. Essentially, a toric lens has one power, known as the spherical power, for correcting the myopia or hyperopia component of refractive error, and a second power, known as the cylinder power, for correcting the astigmatism component, of which both powers are built into a single optical element. These powers are created with curvatures at different angles which are preferably maintained relative to the eye. Toric optics may be utilized in eyeglasses, intraocular lenses and contact lenses. The toric optics used in eyeglasses and intraocular lenses are held fixed relative to the eye thereby always providing optimal vision correction. However, toric contact lenses may tend to rotate on the eye thereby temporarily providing sub-optimal vision correction due to misalignment between the prescribed toric optics and the eye. Accordingly, toric contact lenses also include a mechanism to keep the contact lens relatively stable on the eye when the wearer blinks or looks around.

It is known that correction of certain optical defects may be accomplished by imparting non-rotationally symmetric corrective characteristics to one or more surfaces of a contact lens such as cylindrical, bifocal, multifocal, wavefront corrective characteristics or decentration of the optical zone. It is also known that certain cosmetic features such as print patterns, markings, and the like are required to be placed in a specific orientation relative to the wearer's eye. The use of contact lenses is problematic in that each contact lens of the pair must be maintained at a specific orientation while on the eye to be effective. When the contact lens is first placed on-eye, it must automatically position, or autoposition, itself and then maintain that position over time. However, once the contact lens is positioned, it tends to rotate on the eye due to the force exerted on the contact lens by the eyelids during blinking, eyelid and tear film movement and to some extent, gravity.

Maintenance of the on-eye orientation of a contact lens typically is accomplished by altering the mechanical characteristics of the contact lens. For example, prism ballast stabilization, including decentering of the contact lens' front surface relative to the back surface, thickening of the inferior contact lens periphery, forming depressions or elevations on the contact lens' surface, and truncating the contact lens edge, are all methods that have been utilized.

Additionally, static stabilization has been used in which the contact lens is stabilized by the use of thick and thin zones, or areas in which the thickness of the contact lens' periphery is increased or reduced, as the case may be. Typically, the thick and thin zones are located in the contact lens' periphery with symmetry about the vertical and/or horizontal axes. For example, each of two thick zones may be positioned on either side of the optic zone and centered along the 0-180 degree axis of the contact lens. In another example, a single thick zone positioned at the bottom of the contact lens providing a similar weight effect, like that of prism stabilization, but also incorporating a region of increasing thickness from top to bottom in order to utilize upper eyelid forces to stabilize the contact lens may be designed.

The challenge with static stabilization zones is a tradeoff between contact lens stability and comfort, plus the physical limitations associated with increased thickness. With a static stabilization zone, the slope of the stabilization zone is fixed in the contact lens. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. A static design requires tradeoffs in performance between these two modes.

As individuals age, their eyes are less able to accommodate, or bend their natural or crystalline lens, to focus on objects that are relatively near to the observer. This condition is known as presbyopia. More specifically, when an individual is born, the crystalline lens is pliable which makes it capable of a high degree of accommodation. As the individual ages, the crystalline lens gradually becomes more rigid and thus less able to accommodate. Similarly, for persons who have had their natural or crystalline lens removed and an intraocular lens or IOL inserted as a replacement, the ability to accommodate is absent. Although the intent of an accommodating IOL is to address this potential shortcoming, current accommodating IOL designs and concepts are relatively new and continue to evolve.

Among the methods used to correct for the eye's failure to accommodate is a method known as mono-vision in which, in most cases, a contact lens for correction of distance vision is utilized in the lens wearer's dominant eye, which is known to predominate for distance vision, coupled with a second contact lens for correction of near vision being utilized in the non-dominant eye. Mono-vision provides for both near and distance vision while allowing the brain to compensate as how the images should be construed. Another known method for correction of presbyopia is to use bifocal or multifocal contact lenses in both of the individual's eyes. There are many forms of bi-focal or multi-focal contact lenses for the correction of presbyopia. These design forms include concentric rings and aspheric designs, both of which may be designed for center distance or center near. All of these designs function by providing a range of powers within the pupil of the eye. For example, a concentric ring design may have a central ring that provides powers that are nominally equal to the power required to correct the distance vision of the subject, an adjacent ring that provides near powers, and an outer ring that also provides distance powers. There may also be fitting strategies to address intermediate vision demands between near and far distances, for example, computer screen viewing. Use of bifocal or multifocal lenses in both eyes results in a reduction of image contrast and resolution compared to mono-vision but usually maintains binocularity. Yet another method of treating presbyopia is to place a bifocal or multifocal lens in one eye and a single vision lens in the other eye. The disadvantage in using this method is in the large number of lenses that must be considered in order to provide the individual with satisfactory lens performance and the limitation of binocularity at near distance.

With respect to contact lenses for treating presbyopia, bifocal or multifocal lenses require translation of movement on the eye. Whereas the astigmatic lenses described above require centration and rotational stabilization, lenses for treating presbyopia require a more linear movement in order to keep the required power in the correct place for near, intermediate and distance vision. The means for this translation has taken a number of forms, including lens truncation and thicker zones located in specific regions to cause translation of the lens as the gaze of the wearer shifts. Once again comfort has to be balanced against movement.

Accordingly, it would be advantageous to design a contact lens with surface modified zones that maintain orientation and stability performance while providing the comfort of a single vision lens. The surface modified zones are preferably designed with a balance between the ability to cause rotation versus comfort.

SUMMARY OF THE INVENTION

The friction stabilized contact lenses of the present invention overcomes the disadvantages associated with orientating and maintaining the orientation of contact lenses on a wearer's eye.

In accordance with one aspect, the present invention is directed to an ophthalmic device. The ophthalmic device comprising a contact lens having an anterior surface and a posterior surface and requiring rotational stability on eye, the contact lens being formed from a lens material, and one or more surface modified zones incorporated at least one of into or onto the anterior surface of the contact lens, the one or more surface modified zones being configured to facilitate alignment, via rotation, of the contact lens on the eye at a rotational angle for optimal visual acuity, the one or more surface modified zones comprising a coefficient of friction greater than the remaining portion of the contact lens.

In accordance with another aspect, the present invention is directed to an ophthalmic device. The ophthalmic device comprising a contact lens having an anterior surface and a posterior surface and requiring linear translation on eye, the contact lens being formed from a lens material, and a single modified zone incorporated at least one of into or onto the anterior surface of the contact lens, the single modified zone being configured to facilitate interaction with the lower eyelid such that an eye of the wearer is free to move under the contact lens while the lens remains stationary due to interaction of the single modified zone and a lower eyelid of the wearer, the single modified zone comprising a coefficient of friction greater than non-modified zones of the contact lens.

Commercially available contact lenses that provide angular orientation and stabilization, for example, toric contact lenses, leverage the use of thickness gradients in the design of the lens to interact with the upper and lower eyelids, and to a lesser extent, gravity. Common examples of such gradient designs include prism ballast, periballast, double slab-off, and accelerated stabilization design or ASD. While thickness gradients have proven very effective at orienting and stabilizing lenses on eye, they may suffer from the disadvantage of being inferior in subjective comfort as compared to their single vision counterparts; namely, spherical contact lenses not requiring orientation control and made of the same material. This reduced comfort for performance results from the relatively large stabilization features that interact with the eyelids.

The present invention utilizes friction zones rather than thickness gradients to orient and stabilize a lens on eye. The friction zone or zones is basically a modification of one or more specific regions of the anterior surface of the contact lens to generate a friction driven rotational force when the upper and/or lower eyelid passes over the one or more regions during a blink. The modification may be formed in any suitable manner, for example, local surface roughness modification, local surface hydrophobicity modification or local surface material coefficient of friction modification. It is important to note that in addition to surface roughness, well defined surface topologies (textures), for example, an array of bumps or serrated patterns with constant height may be utilized. These textures may be formed by laser texturing on the lens molds. The advantage of constant height in these patterns is that the high peaks which may cause discomfort are avoided. These well-defined patterns are distinct from a random surface roughness. Essentially, the friction zones would replace the increased thickness zones. In addition, only a relatively small difference in the coefficient of friction, for example, a delta of approximately 0.10, between the modified and unmodified regions of the anterior surface of the lens may result in an equivalent rotational force to that of a thickness gradient lens. This small difference in the coefficient of friction may provide a means to orient and stabilize a contact lens while increasing the subjective comfort performance of the lens.

As set forth above, the friction zones may be formed in any suitable manner consistent with the manufacture of contact lenses. However, it is important to note that independent of the process utilized to form the friction zones, a number of parameters may be varied to optimize a particular design. For example, the size, shape and location of the friction zones may be modified to optimize a particular design. In addition, the directionality of the friction zones may be altered to change the degree and speed of rotation.

Also, within the friction zones themselves simple modifications may be made which affect the degree and speed of rotation. For example, each friction zone may comprise regions having differing coefficients of friction, differing textured patterns, differing frequencies within the textured patterns, and differing heights of the elements forming the textured patterns. Specifically, the intrinsic anisotropy of the friction zones, i.e. different friction in opposite directions, may be utilized for a desired effect. In other words, the friction force would depend on the local sliding direction at the eyelid-contact lens interface, for example, creating higher friction zones during a down-blink as compared to an up-blink. However, with this type of design, a user or wearer would have to always ensure that the contact lens is inserted correctly and not upside down.

These modified zones essentially stimulate a change in the local pre-lens tear film pressure and thickness by locally influencing the hydrodynamics at the eyelid-contact lens interface

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
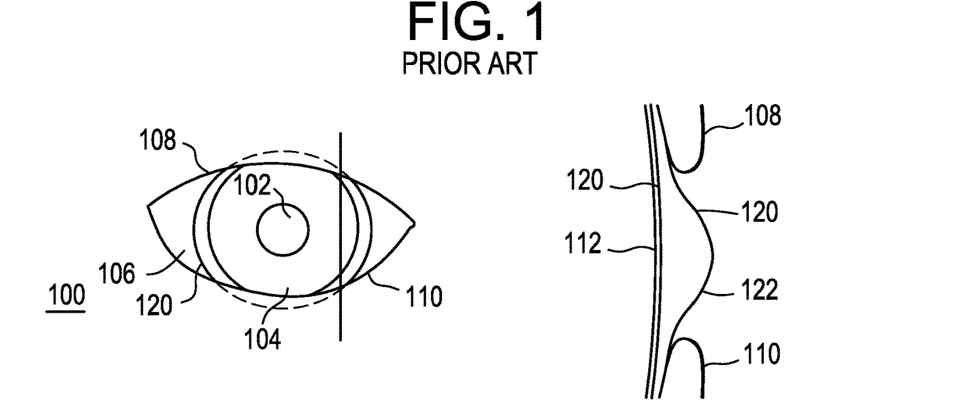
FIG. 1 is a diagrammatic representation of a prior art contact lens having an eyelid stabilized design feature in planar and cross sectional views.

Currently, contact lenses requiring rotational stabilization in order to maintain optimal visual acuity, for example, toric contact lenses, rely on either weight or eyelid pressure to maintain the contact lens oriented on the eye. Referring to FIG. 1, there is illustrated in both plan and cross-sectional view an eyelid pressure stabilized design wherein the contact lens 120 is thicker in a stabilization zone or region 122. The contact lens 120 is positioned on the eye 100 such that it covers the pupil 102, the iris 104 and a portion of the sclera 106 and sits under both the upper and lower eyelids 108 and 110 respectively. The thicker stabilization zone 122 in this design is positioned over the cornea 112. Once stabilized, the stabilization zone 122 is maintained between the upper and lower eyelids 108 and 110.

Figure 2:
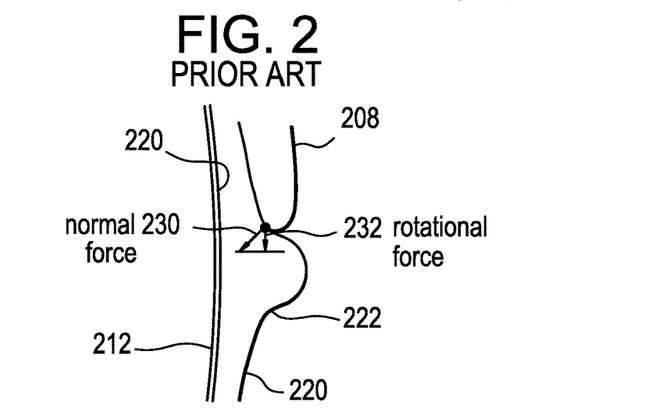
FIG. 2 is a detailed diagrammatic representation of the interaction zone between the upper eyelid and the contact lens of FIG. 1.

FIG. 2 illustrates in greater detail how the thicker stabilization zone 222 interacts with the upper eyelid 208 to induce a force that tends to rotate the contact lens 220. The critical parameter driving this rotational force is the angle of the contact area between the upper eyelid 208 and the stabilization zone 222 of the contact lens 220. As illustrated, the normal force, represented by vector 230, at a point of contact between the upper eyelid 208 and the periphery of the thicker stabilization zone 222 may be resolved into a rotational force, represented by vector 232. The steeper the angle of the stabilization zone 222, the greater the rotational force component of the normal force acting on the contact lens 220. Conversely, the lower or flatter the angle of the stabilization zone 222, the lower the rotational force component of the normal force acting on the contact lens 220.

The present invention utilizes friction zones rather than thickness gradients to orient and stabilize a lens on eye. The friction zone or zones is basically a modification of one or more specific regions of the anterior surface of the contact lens to generate a friction driven rotational force when the upper and/or lower eyelid passes over the one or more regions during a blink. The modification may be formed in any suitable manner, for example, local surface roughness modification, local surface hydrophobicity modification or local surface material coefficient of friction modification. Essentially, the friction zones would replace the increased thickness zones. In addition, only a relatively small difference in the coefficient of friction, for example, a delta of approximately 0.10 or greater, between the modified and unmodified regions of the anterior surface of the lens may result in an equivalent rotational force to that of a thickness gradient lens. This small difference in the coefficient of friction may provide a means to orient and stabilize a contact lens while increasing the subjective comfort performance of the lens. What makes this possible is that the normal eyelid force and eyelid velocity during down-blink is larger than the normal eyelid force and eyelid velocity during up-blink, thereby causing a net rotation or movement.

In accordance with the present invention, one or more specific regions of the anterior surface of a contact lens may be modified to generate a friction driven rotational force when the upper and/or lower eyelid(s) passes over the one or more surface modified regions during a blink. The surface modification may comprise local surface roughness modification, local surface hydrophobicity modification, local surface material coefficient of friction modification or any suitable surface modification that alters/raises the coefficient of friction in these zones relative to the remaining portion of the contact lens. As noted above, only a small difference in the coefficient of friction between the modified and unmodified regions of the anterior surface of the contact lens may result in an equivalent rotational force to that of a conventional thickness gradient lens as is explained in greater detail subsequently.

Various methods may be utilized to create these surface modified zones on or in the anterior surface of the contact lens. On such method involves nano and/or micro texturing or patterning of the contact lens in specific regions. The location of these friction regions depends upon a number of factors as does the placement of thickness gradients and is known in the art. In accordance with yet another method, the optical inserts and/or plastic molds that are utilized to fabricate the contact lens may be nano and/or micro textured or patterned in specific regions. In accordance with still yet another method, pad printing of different materials into the front curve mold in the stabilizing regions, similar to the process utilized for printing designs in the manufacture of cosmetic contact lenses, may be utilized. In accordance with still yet another method, various coatings or graftings, including polymers, may be applied to specific predetermined regions of the contact lens, post processing. Any other suitable process to create zones of friction may be utilized in accordance with the present invention, including any combination described herein.

In one exemplary embodiment, no thickness gradient would be required and the contact lens would be solely oriented and stabilized by the surface modification creating a friction driven rotational force. In this exemplary embodiment, the overall design of the toric lens would be the same as a single vision lens with the exception that the optical zone would be configured with the specific geometry for correcting the myopia/hyperopia and astigmatism refractive errors. In an alternate exemplary embodiment, one or more surface modifications may be combined with reduced thickness gradients in order to improve comfort by thinning the thick zones and still maintain orientation and stability performance via the surface modifications. In yet still another alternate exemplary embodiment, one or more surface modifications may be combined with full thickness gradients solely to improve rotation and stability performance.

Figure 3:
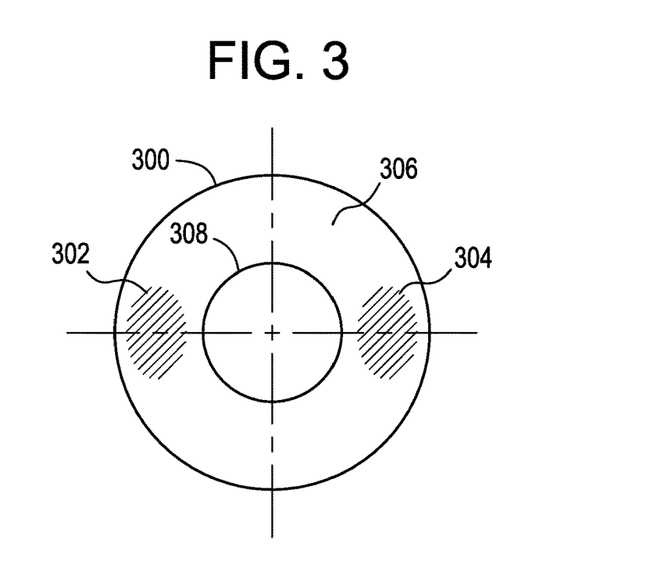
FIG. 3 is a diagrammatic representation of a contact lens with modified surface zones in accordance with the present invention.

Referring to FIG. 3, there is illustrated an exemplary embodiment of a contact lens 300 comprising two surface modified zones 302 and 304 and no thickness gradient zone. In this exemplary embodiment, the surface modified zones 302 and 304 are positioned symmetrically about the horizontal axis of the contact lens 300 and about one hundred eighty (180) degrees apart from one another. The two surface modified zones 302 and 304 are located in the peripheral zone 306 of the contact lens 300 which surrounds the optic zone 308. FIG. 3 illustrates, in planar view, the anterior surface of the contact lens 300 which is the surface making contact with the eyelids. It is important to note that any number of surface modified zone configurations may be utilized, including a single zone. In one exemplary embodiment, the two surface modified zones 302 and 304 are formed from a material with a higher coefficient of friction than the surrounding bulk lens material. As set forth above, it has been demonstrated that a delta of 0.10 in coefficient of friction is sufficient to generate the required rotational force to orient and maintain orientation of a contact lens on eye. In addition, data from experimentation suggests that a difference in the coefficient of friction of 0.10 is significantly less than the variation in the coefficient of friction between the materials utilized between contact lens manufacturers. In other words, simply utilizing a material from another lens may be sufficient to generate the delta of 0.10 thus indicating that there would be no appreciable difference in comfort given the area of the zones relative to the remaining portion of the contact lens. More specifically, if the lens were formed from a silicone hydrogel such as senofilcon A, which is a well known and patented material for manufacturing contact lenses which has an extremely low coefficient of friction; namely, less than about 0.05, than any number of other materials with low coefficients of friction which are suitable for contact lens manufacture and differ by 0.10 over senafilcon A may be utilized to create the surface modified regions. Simply stated, no high friction zones need be required, just different lens materials. Acuvue® Oasys® Brand Contact Lenses available from Johnson & Johnson Vision Care Inc. are formed from senofilcon A. Other manufacturers utilize materials with coefficients of friction greater than 0.15 as is known in the relevant art.

In accordance with another exemplary embodiment, the surface modified zones 302 and 304 may be formed via a micro-texturing process which is described in greater detail in the experiment set out herein. The purpose of the experiment was to demonstrate feasibility that a spherical contact lens consisting of surface modified zones on the anterior surface with a higher coefficient of friction (relative to the non-modified zones) will rotate, orient, and stabilize on eye.

The test contact lens was manufactured using a soft-stabilized molding (SSM) process. To achieve the surface modified zones of higher coefficient of friction, the optical inserts used to fabricate the plastic lens molds, which in turn are used to fabricate the contact lens, were micro-textured, in a random pattern, using a blasting process consisting of glass beads media. A mask was applied to localize the texturing to two axially symmetric and oblong regions of interest in the periphery of the lens. The contact lens was then manufactured using the SSM process with senofilcon A monomer.

Figure 4:
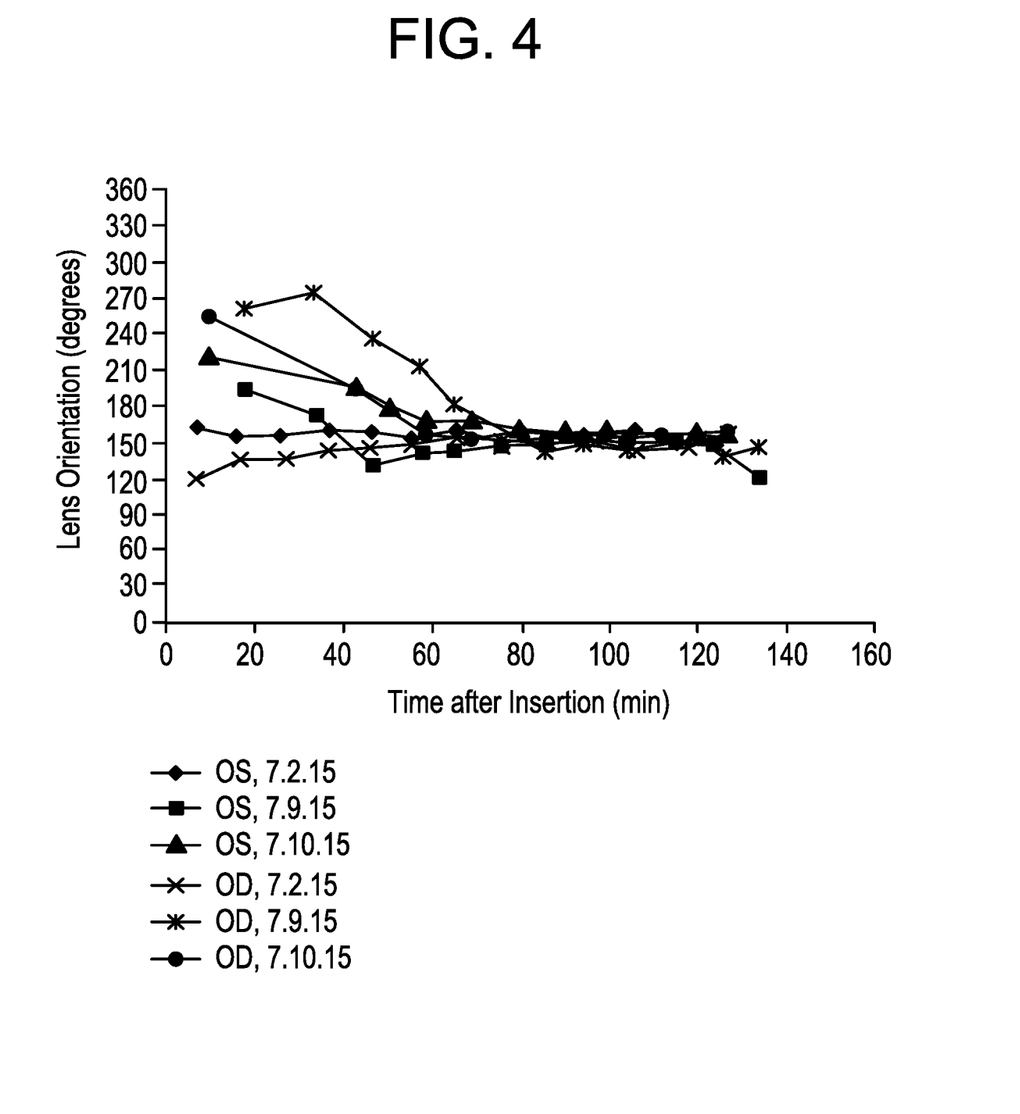
FIG. 4 is a plot of lens orientation versus time after insertion for contact lenses with modified surface zones in accordance with the present invention.

A total of six (6) test lenses were then evaluated for on-eye orientation over a three (3) hour wear time. All lenses were marked at a common location and angual orientation was measured relative to the intracanthal line, where zero was defined as the nasal side. FIG. 4 illustrates a plot of lens orientation versus time after insertion for all six lenses. The plot of FIG. 4 demonstrates that all six (6) lenses started out in different orientations upon lens insertion, then rotated over time, and ultimately settled into a consistent resting position and remained stable at that position. The time to settle occurred at about sixty (60) minutes. While this time is not insignificant, the experiment proves that friction zones may be utilized to rotate a lens on-eye. Accordingly, the friction zones may be optimized to increase the degree and speed of rotation. These lenses were tested for coefficient of friction in both the surface modified zones and the non-modified zones. The surface modified zone and non-modified zone exhibited a coefficient of friction of 0.11 and 0.01, respectively. Thus, it has been shown here that a difference in coefficient of friction of 0.1 can result in rotation, orientation, and stabilization of a contact lens.

As set forth above, the settling time in the experiment was approximately sixty (60) minutes, but it is important to note that the experiment was to demonstrate feasibility and not to achieve an optimum design. As stated above, the friction zones may be formed in any suitable manner consistent with the manufacture of contact lenses and that independent of the process utilized to form the friction zones, a number of parameters may be varied to optimize a particular design. For example, the size, shape and location of the friction zones may be modified to optimize a particular design. In addition, the directionality of the friction zones may be altered to change the degree and speed of rotation. Also, within the friction zones themselves simple modifications may be made which affect the degree and speed of rotation. For example, each friction zone may comprise regions having differing coefficients of friction, differing textured patterns, differing frequencies within the textured patterns, and differing heights of the elements forming the textured patterns.

Friction zones, as demonstrated herein, may result in an equivalent rotational force to that of a conventional thickness gradient lens. In various exemplary embodiments, these friction zones may completely replace the thicker zones of conventional lenses or alternatively, the friction zones may supplement thinner stabilization zones or vice versa. In other words, a standard stabilization zone may be reduced in total thickness in proportion to an increase in the coefficient of friction as set forth herein. However, it is important to understand that there is a clinically demonstrated relationship between coefficient of friction and comfort. As the coefficient of friction in a contact lens increases, the level of subjective wearer comfort decreases. Accordingly, any lens utilizing the surface modified zones in accordance with the present invention, preferably balances the size of the zones with comfort as well as the difference in coefficient of friction between the modified and un-modified zones. Therefore, if the zones are small enough and the differential in the coefficient of friction is low enough, there may be no noticeable difference in comfort.

More specifically, it should be appreciated that if the coefficient of friction differential or delta between the modified and unmodified zones is greater, stabilization or desired movement of the lens may be achieved faster. However, increasing the difference in the coefficient of friction may impact comfort and thus any design should seek to balance this difference with comfort. The studies linking coefficient of friction and comfort have been for the lens material itself. In other words, the entire lens has one single coefficient of friction and lenses with a higher number are less comfortable that those with a lower number. In the present invention, only a small portion of the lens anterior surface has a higher coefficient of friction and the impact may not be significant relative to comfort. More specifically, it should be appreciated that any small discomfort due to the higher friction zone is more than offset by the improvement in comfort due to there being no or minimal thickness difference. Accordingly, the size, shape and pattern of the surface modified zones may be optimized with respect to the shape and movement of the eyelids, a strategically desired shape, to produce the desired degree and speed of movement with a lower difference in the coefficient of friction.

In a newborn, the crystalline lens of the eye is somewhat soft and pliant making it extremely flexible and capable of a large degree of accommodation or focusing. As a person ages, the crystalline lens gradually becomes more rigid, and thus, their eyes are less able to accommodate, or bend the natural lens, to focus on objects that are relatively near to the observer. This condition is known as presbyopia.

A plus power lens may be utilized to restore the focusing power lost by the crystalline lens. The plus power lens may take the form of reading glasses, bifocal glasses or trifocal glasses. Reading glasses are easily utilized when an individual does not need refractive correction for distance. However, distant objects will be blurry when looking through reading glasses. If an individual is already wearing glasses for myopia, hyperopia and/or astigmatism, then the plus power may be added to the existing glasses in the form of a bifocal or trifocal lens. Contact lenses may also be worn to address presbyopia. In one type of such lenses, distance and near vision regions are concentrically arranged around the geometric center of the lens. Light passing though the optical zone of the lens is concentrated and focused at more than one point in the eye. These lenses are generally used in simultaneous vision mode. In simultaneous vision, portions of the lens optical zone focused for distance and near are available at the same time, focusing light from both object distances simultaneously. This is disadvantageous as image quality and image contrast may be degraded.

In another type of contact lens; namely, a segmented lens, near and distance vision regions are not concentric about the geometric center of the lens. The wearer of the segmented lenses is able to access the near vision region of the lens because the lens is constructed to allow it to translate, or move vertically relative to the pupil of the wearer's eye. This translating lens moves vertically when the person wearing the lens shifts their gaze downwardly, for example, to read. This upwardly positions the near vision portion in the center of the wearer's gaze. Substantially all of the light passing though the optical zone may be focused at a single point in the eye based on gaze.

One type of translating lens has a truncated shape. That is, unlike most lenses that are substantially continuously circular or oval, the lower portion of the truncated contact lens is flattened by cutting off or shortening that part of the lens. This results in a substantially flat, thick edge at the bottom of the lens. Exemplary descriptions of such lenses are set forth in a number of patents, including U.S. Pat. Nos. 7,543,935, 7,052,132, and 4,549,794. However, a relatively flat edge on contact lenses such as these may tend to reduce comfort. It is therefore desirable to have a translating contact lens without this type of edge design thereby providing improved comfort.

Another type of translating lens has an outer shape which is continuously circular or oval, but comprises a substantially thickened portion peripheral to the central optical zone. This thickened portion is intended to contact the lower lid and positionally translate when the wearer looks down. Exemplary references to such a lens are described in U.S. Pat. No. 7,040,757 and US Patent Publication No. 2010/0171924. In the exemplary embodiment set forth therein, the thickness in the peripheral portions of the lens outside the optical zone is substantially uniform for meridians parallel to the vertical meridian of the lens and which exhibits mirror symmetry with respect to a plane cutting though the vertical meridian.

In accordance with another exemplary embodiment, a surface modified zone may be utilized in a bi-focal or multifocal lens wherein the add power for viewing near objects must remain remain in the central viewing area of a wearer when the wearer gazes downward or at a near object and returns to the normal distance power region when gazing forward and/or upward at a distant object. In this exemplary embodiment, a single modified zone may be positioned on the anterior surface of the peripheral region of a lens in the inferior half of the lens, in other words, below the imaginary horizontal axis running through the geometric center of the lens. The single modified zone would have a coefficient of friction higher than the remaining portions or regions of the anterior surface of the lens as well as the entire posterior region of the lens. With this arrangement, when a wearer gazes downwardly, for example, when viewing a near object, the force on the lower eyelid on the anterior surface of the lens is greater than the force exerted by the lower eyelid on the posterior surface of the lens due to the frictional forces as described above, thereby allowing the eye to rotate under the lens which in turn allows the wearers line of sight to remain in the proper portion of the optic zone of the lens; namely, the near viewing region. This type of movement will work for the same reasons that the exemplary lenses described above rotate.

Figure 5:
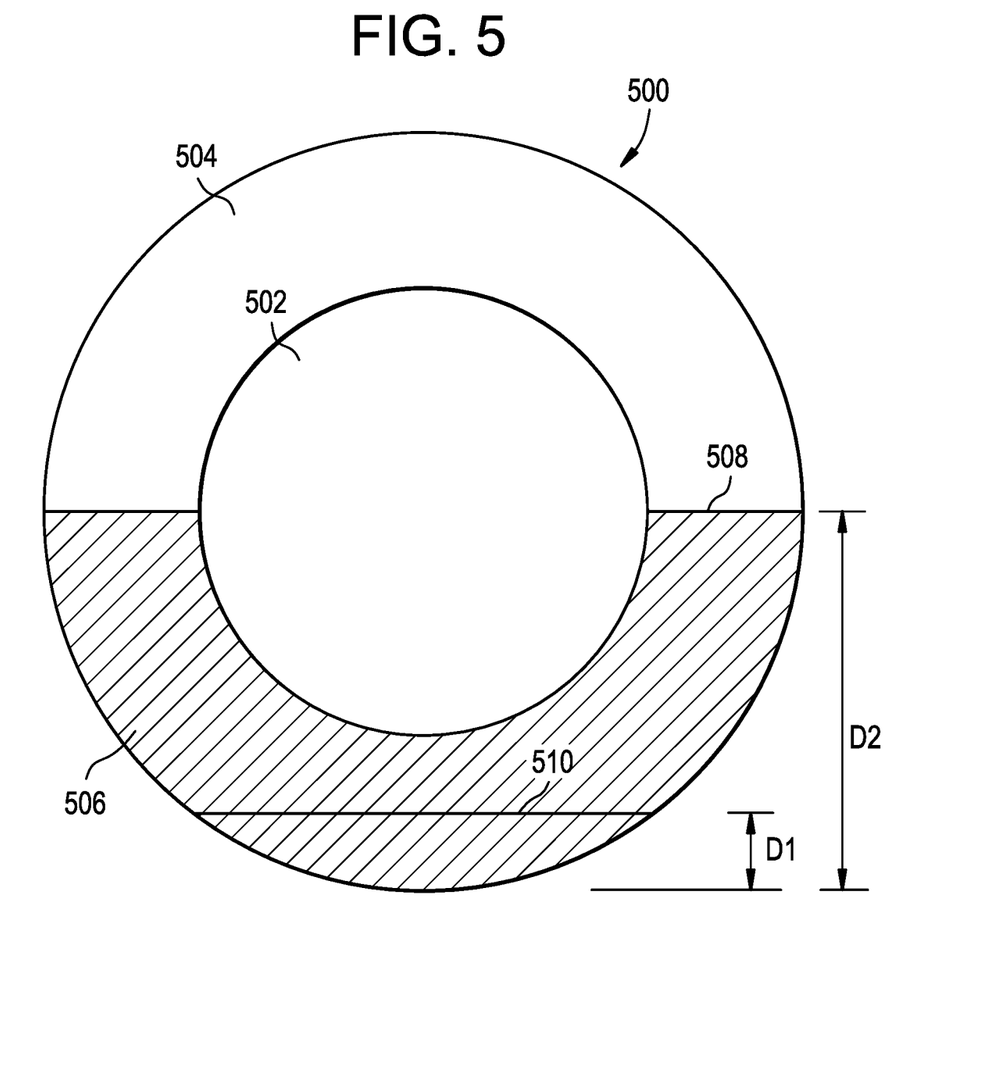
FIG. 5 is a diagrammatic representation of a contact lens with a single modified surface zone for a multi-focal lens in accordance with the present invention.

FIG. 5 illustrates a contact lens 500 having an optic zone 502, a peripheral zone 504 surrounding the optic zone and a single surface modified zone 506 with a coefficient of friction higher than other regions of the lens as described above. The single surface modified zone 506 may comprise any suitable shape for interacting with the eye lid as described herein. In one exemplary embodiment, the single surface modified zone 506 with its increased coefficient of friction extends from an imaginary horizontal axis 508 passing through the geometric center of the lens 500 to the bottom edge of the lens. For a 14 mm lens, this would be about a 7 mm section of the lens with an annular shape as represented by distance line D2. In a preferred embodiment, the single surface modified zone 506 would extend from the bottom edge of the lens 500 up towards the geometric center of the lens 500 and stop at an imaginary axis 510 which is about a distance of 1.5 mm from the bottom edge as represented by distance line D1.

It is important to note that the single modified zone 506 may be created in accordance with any of the methods described herein, but only on one side of the lens. In addition, as before, comfort versus coefficient of friction and size of the zone is preferably considered.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device comprising: a contact lens having an anterior surface and a posterior surface, the contact lens being formed from a first bulk lens material, and having an optic zone and a peripheral zone surrounding the optic zone, wherein the optic zone includes target powers in two orientations that are perpendicular to correct for astigmatism, and/or the optic zone has two different powers to correct for presbyopia; and a single modified zone being located in the peripheral zone and incorporated at least one of into or onto the anterior surface of the contact lens, the single modified zone being configured to facilitate linear and/or rotational alignment of the contact lens on the eye for optimal visual acuity, the single modified zone having a substantially annular shape and being located below and comprising a second lens material with a coefficient of friction greater than the first bulk lens material by a difference of 0.1 incorporated into or onto the anterior surface of the contact lens, the thickness of the contact lens does not change by incorporation of the second material, wherein the greater coefficient of friction in the single modified zone creates a force that opposes eyelid forces during blinking to linearly and/or rotationally stabilize the contact lens, and wherein said force created by the single modified zone is less than or equal to the difference in force applied to the lens by the eyelids during down-blink and up-blink.

2. The ophthalmic device according to claim 1, wherein the lens material comprises a silicone hydrogel.

3. The ophthalmic device according to claim 1, wherein the single surface modified zone is positioned in an inferior portion of the contact lens.

4. The ophthalmic device according to claim 3, wherein the single surface modified zone is positioned between a horizontal axis extending through a geometric center of the contact lens to a bottom edge of the contact lens.

5. The ophthalmic device according to claim 1, wherein the single surface modified zone extends from as a bottom edge of the contact lens towards a the geometric center of the contact lens and has a distance of about 1.5 mm.

6. The ophthalmic device according to claim 1, wherein the coefficient of friction is at least 0.1 and less than 1.

* * * * *